United States Patent
Wigglesworth et al.

(10) Patent No.: US 7,484,671 B2
(45) Date of Patent: Feb. 3, 2009

(54) WATER FEATURE

(75) Inventors: Simon Howard Wigglesworth, London (GB); Franz Roecker, Aitrach (DE)

(73) Assignee: Smart Solar Limited (GB)

( * ) Notice: Subject to any disclaimer, the term of this patent is extended or adjusted under 35 U.S.C. 154(b) by 0 days.

(21) Appl. No.: 10/566,539

(22) PCT Filed: Jul. 30, 2004

(86) PCT No.: PCT/GB2004/003308

§ 371 (c)(1),
(2), (4) Date: Sep. 12, 2006

(87) PCT Pub. No.: WO2005/011874

PCT Pub. Date: Feb. 10, 2005

(65) Prior Publication Data

US 2007/0102534 A1    May 10, 2007

(30) Foreign Application Priority Data

Jul. 31, 2003  (DE) ............ 203 11 791 U
Feb. 24, 2004  (DE) ............ 20 2004 002 860 U
May 10, 2004  (GB) ............ 0410393.3

(51) Int. Cl.
  *F21S 8/00* (2006.01)
(52) U.S. Cl. ............ 239/20; 239/23; 239/17; 239/289; 119/69.5
(58) Field of Classification Search ............ 239/17, 239/20, 22, 23, 211, 289, 18; 417/411; 136/244; 119/69.5
See application file for complete search history.

(56) References Cited

U.S. PATENT DOCUMENTS

| 4,122,396 | A  | * | 10/1978 | Grazier et al. ............ 455/343.1 |
| 5,040,726 | A  | * | 8/1991 | Dimitri ............ 239/17 |
| 6,179,218 | B1 | * | 1/2001 | Gates ............ 239/17 |
| 6,435,422 | B1 | * | 8/2002 | Wutschik ............ 239/23 |
| 6,527,197 | B1 | * | 3/2003 | Lin ............ 239/20 |
| 6,583,349 | B2 |   | 6/2003 | Tanaka |
| 2002/0041505 | A1 |   | 4/2002 | Suzui et al. |

FOREIGN PATENT DOCUMENTS

| DE | 29918542 U1 | 2/2000 |
| DE | 20015231 U1 | 5/2001 |
| JP | 08196966 | 8/1996 |
| JP | 08196966 A | 8/1996 |

OTHER PUBLICATIONS

PCT Written Opinion of the International Searching Authority (ISA/EP) for application No. PCT/GB2004/003308, May 4, 2005, 8 pages.

* cited by examiner

*Primary Examiner*—Dinh Q Nguyen
(74) *Attorney, Agent, or Firm*—McDonnell Boehnen Hulbert & Berghoff LLP

(57) ABSTRACT

A water feature comprising a vessel (1) for containing water, an electrically powered submersible water pump (2) within the vessel (1) for pumping water to an outlet of the water feature and a solar panel (4) arranged to provide electrical power to the water pump (2). The solar panel (4) is arranged within said water vessel (1) above the water pump and so as to be beneath the water level (7) in the vessel (1) in use.

20 Claims, 4 Drawing Sheets

WATER FEATURE

The present invention relates to water features and in particular garden water features which are powered by solar cells. The invention also relates to the control of solar powered devices for such water features and for other purposes.

The use of solar cells as a source of power for garden products and ornaments is known in the art. For example, it is know to connect a solar panel to an electric pump to supply, or circulate, water to or around a garden water feature. The solar panel is selected so as to generate a sufficient amount of electrical energy to operate a given water pump.

In areas of low light levels, or where overcast weather is prevalent, the use of solar panels to power electric motors can be problematic, particularly in terms of the lifetime of a motor. It is known the art to operate electric motors and pumps using energy from solar (photovoltaic) cells. According to the prior art there are two common methods of powering pumps.

The first method of driving a pump is to use an electromagnetic drive. In these, a magnetic field is generated by means of a magnetic coil. As energy is supplied the magnet with the rotor is set in motion. This type of drive ensures a long service life (more than 30,000 hours) and the only part subject to wear is the rotor, which can be replaced at any time.

With regard to operation using solar energy this drive has the disadvantage that considerable energy is required to create the magnetic field, which in turn requires a great deal of sun. These products have not caught on in the market as customers find the market prices unreasonable or, in view of the serious price difference (more than 300%) between the solar-powered pump and a mains-operated pump, opt for the mains-powered pump.

The second method is to use a pump with an electric motor drive. In these, a conventional electric motor with brushes is used, which drives a rotor directly or via a magnetic clutch. This drive requires up to 200% less energy than an electromagnetic drive and therefore considerably less solar power. This drive has caught on in the market. The disadvantage of this drive is that the brushes of the electric motors are generally prone to wear, which leads to increased current consumption the longer they are used and hence to an increasing deterioration in the running performance, particularly in inadequate light conditions (grey morning light, cloud, shade). The maximum service life of a brush motor of this kind can be estimated at about 7,000 to 10,000 hours when operated by mains power. The service life when operated by solar energy is reduced by a further 50% because of two solar-specific properties.

Firstly, because of the constantly altering sunshine conditions the motor is subjected to a constant stop-start rhythm, which leads to overloading of the brushes and also the motor. Secondly solar panels have the characteristic that their nominal voltage is applied even under poor lighting conditions. In the operation of electric motors this means that, in poor light, sparking may occur on the brushes as a result of this nominal voltage applied to the motor, as the current supplied from the solar module is not yet sufficient to run the motor. The brushes then become worn without the motor actually doing its job.

There is therefore a need for a motor controller capable of extending the operational life of a motor when powered by a solar panel or cell, which prevents motor brush wear.

Accordingly, one invention disclosed herein provides a controller for a solar powered electric device, comprising:
 (a) an input for receiving power from a photovoltaic cell;
 (b) an output for providing power to a solar powered electric device, said device having a predefined minimum operating voltage; and
 (c) switching means for supplying electrical power from said input to said output;

wherein said switching means is automatic and adapted to supply power to said output only when the voltage received from said input is equal to or higher than said predetermined minimum operating voltage of said electric device.

Viewed from another aspect, such an invention also provides a method of controlling the supply of electrical energy from a photovoltaic cell to a solar powered electrical device, wherein the solar powered electric device has a predefined minimum operating voltage which is above zero; and wherein the method comprises the step of automatically preventing supply of electrical energy from the photovoltaic cell to the solar powered electrical device when the voltage is above zero but less than the predefined minimum operating voltage of the solar powered electrical device.

The solar powered electrical device could be, for example, a motor for any suitable equipment, where constant supply of electrical energy below a specified minimum voltage may cause unnecessary wear or damage. Preferably, the device is the electric motor of a pump for a water feature.

In a preferred embodiment, the controller prevents power being supplied to the motor unless the power being received from the photovoltaic cells is above the start voltage of the motor. This prevents damage to the motor brushes and thereby increases the operational life of the motor.

The start voltage chosen could, for example, be at least 3 V.

The switching means may be any suitable switch for electrically connecting the photovoltaic cell to the motor or other device. The switching mans may for example be a transistor or thyristor. Preferably the switching means is a silicon controlled rectifier (SCR). Circuitry for controlling the switching means in accordance with the detected voltage level from the photovoltaic cell may incorporate a Zener diode or equivalent component. In a preferred arrangement, a Zener diode is chosen which has a suitable Zener breakdown voltage such that it will only switch on when the voltage from the photovoltaic cell is above the predetermined minimum operating voltage. That is used to trigger the gate of an SCR so as to connect the device to the voltage output by the photovoltaic cell. That voltage will increase with increasing sunlight. The SCR disconnects the photovoltaic cells from the motor when the voltage being generated by the photovoltaic cells becomes zero i.e. when there is no sunlight.

As an alternative, the switching means may be provided with further circuitry to disconnect the photovoltaic cells from the motor when the voltage being supplied by the photovoltaic cells falls below a predefined voltage level.

In water features according to the prior art, pumps are located beneath the surface of the water and are connected to a solar cell which, for reasons of aesthetics, are arranged some distance from the feature itself. The solar cell and pump are electrically connected by a length of electrical cable.

Solar powered water features according to the prior art furthermore require the separate installation of water feature and solar panel and also require a length of electrical cable which must be laid or buried between the two.

There is therefore a need for a solar powered water feature which overcomes the problems of the prior art and which can be powered using a solar cell or panel.

One invention disclosed herein provides a water feature comprising
 (a) a vessel for containing water;
 (b) an electrically powered submersible water pump within the vessel for pumping water within the vessel to an outlet of the water feature; and
 (c) a solar panel arranged to provide electrical power to said water pump;

wherein the solar panel is disposed within said water vessel above the water pump and so as to be beneath the water level in the vessel in use.

One advantage of this arrangement of water feature is that there is no longer the need to site an exterior solar panel and to have a cable running from the water feature to the solar panel. Furthermore a user does not have to install the solar panel separately from the water feature since they can be supplied to an end user assembled together as a single, compact unit. In addition, the solar panel can conceal the pump, wiring, pipes and so forth from view. The solar panel itself is unobtrusive since, in use, it is covered by water in the vessel. In preferred embodiments, apart from the water feature outlet and any appropriate visible connection to the water pump, all operating components of the feature—such as the pump, the solar panel, interconnecting wiring and pipes—will be below the surface of water in the vessel in use.

In an alternative arrangement the pump may be arranged separately from the vessel, for example if it is of non-submersible type and/or needs to draw water from another source. Thus, another invention disclosed herein provides a water feature comprising:
(a) a vessel for containing water;
(b) a water outlet for recirculating water into the vessel;
(c) means for connecting the water outlet to the output of an electrically powered water pump;
(d) a solar panel arranged to provide electrical power to said water pump; and
(e) means for transmitting electrical power from the solar panel to the electrically powered water pump;
wherein the solar panel is disposed within said water vessel so as to be beneath the water level in the vessel in use, and the means for transmitting electrical power from the solar panel to the electrically powered water pump is below the solar panel.

In general the solar panel will be disposed in a horizontal plane.

In another arrangement, the solar panel and pump are both within the vessel but are laterally separated. Thus, in general, an invention disclosed herein provides a water feature comprising:
(a) a vessel for containing water;
(b) a water outlet for recirculating water into the vessel;
(c) means for connecting the water outlet to the output of an electrically powered water pump;
(d) a solar panel arranged to provide electrical power to said water pump; and
(e) means for transmitting electrical power from the solar panel to the electrically powered water pump;
wherein the solar panel, the electrically powered water pump and the means for transmitting electrical power from the solar panel to the electrically powered water pump are disposed within said water vessel so as to be beneath the water level in the vessel in use, and both the pump and the solar panel are supported by the water vessel.

The term "water feature" includes functional or ornamental garden products such as bird baths, cascades or fountains in which water is re-circulated. The pump may be arranged to generate a fountain above the solar panel or, alternatively, the pump may be arranged to circulate water around the product. For example, the feature may comprise a number of water vessels arranged above one another such that water can flow from an upper vessel to a lower vessel in a cascade. The solar powered pump may then re-circulate water to an upper vessel.

The solar panel may be arranged on the bottom of the vessel if there is a separate pump outside the vessel or if there is a laterally displaced pump within the vessel, but is preferably arranged within the vessel so as to define a volume of water above the panel and a volume of water below the panel in which the pump is arranged. The panel is preferably at a depth so that it is at least partially concealed from view by the volume of water above the panel. However the depth of the panel in the water should not be excessive, so that insufficient light can reach the panel to power the pump. In a preferred arrangement the panel is arranged at such a depth that small birds can stand on the panel.

In a preferred arrangement, the solar panel separates the vessel into two discrete volumes of water, contacting the vessel around the periphery. However, apertures through the panel or, for example spaces between the panel and the wall of the vessel, will normally be provided so as to give a return path for water to a pump disposed below the panel. Alternatively, the panel could be a free-standing unit submerged in the vessel without defining discrete volumes of water. The solar panel and pump may be arranged on a removable insert which can be placed into a corresponding recess in the vessel or water feature body, with the panel for example being supported on a peripheral ridge or other means part way up the vessel, or can alternatively be a unit which rests on the bottom of the vessel.

The pump may issue water into a conduit for circulation around the feature, for example in a cascade from one or more additional containers before returning to the vessel, or may issue water in the form of a fountain. The solar panel and pump may be arranged such that water issues through the solar panel.

Pumps suitable for use with water features are known in the art and are powered by means of energy from solar panels or cells, e.g. in the form of so-called "solar islands". Generally pumps known in the art are submersible pumps. It would be possible for a pump to be placed under the surface of the water and connected to a solar panel positioned on or near the surface of the water by means of an unbreakable connection. The pump and solar panel would thus be a single unit. A considerable disadvantage of a product of this kind would be that in general the service life of a solar cells far exceeds that of a pump. Consequently, the product would become unusable if the pump is defective and would thus have to be thrown away even though the current source, which is generally the major cost factor of such products, is still operating perfectly well. Thus, in a preferred arrangement the water pump and solar panel are electrically connected by means of a water tight separable connection such as a plug and socket, so that the pump can be replaced separately from the solar panel. This is inventive in its own right and thus another invention disclosed herein provides a water feature having a water pump and solar panel as a unit to be disposed in water with at least the pump submerged, wherein the solar panel and the pump are electrically connected by means of a submerged, water tight separable connection. This invention may be used with the inventions discussed earlier, or separately.

The particular advantage of this arrangement is that in the event of a defect, the pump and/or the solar panel can be replaced as necessary.

A water feature in accordance with this invention could, for example, be a floating unit, with the solar panel arranged either above or below the water level.

The various inventions disclosed above, including the control circuit for supplying electricity to e.g. a water feature pump, and the details of the water features, may be used alone or together in any desired combination.

Preferred embodiments of the inventions will now be described, by way of example only, with reference to the accompanying drawings in which.

Figure 7A:
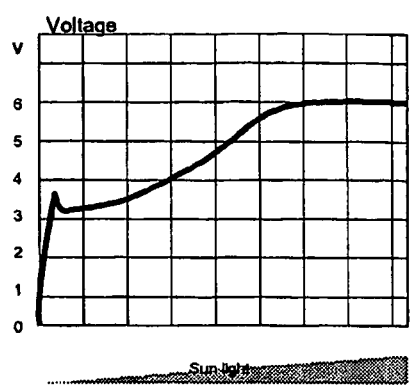

FIGS. 7A & B show graphs of voltage and current for the motor controller under rising sun conditions.

Figure 1:
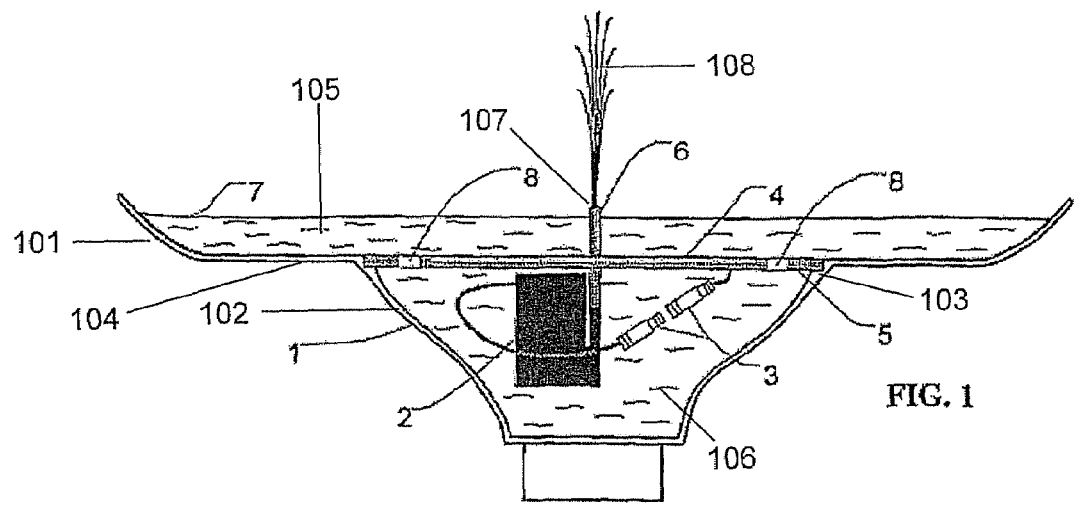
FIG. 1 shows a cross-section of a water feature according to a present invention.
Figure 2:
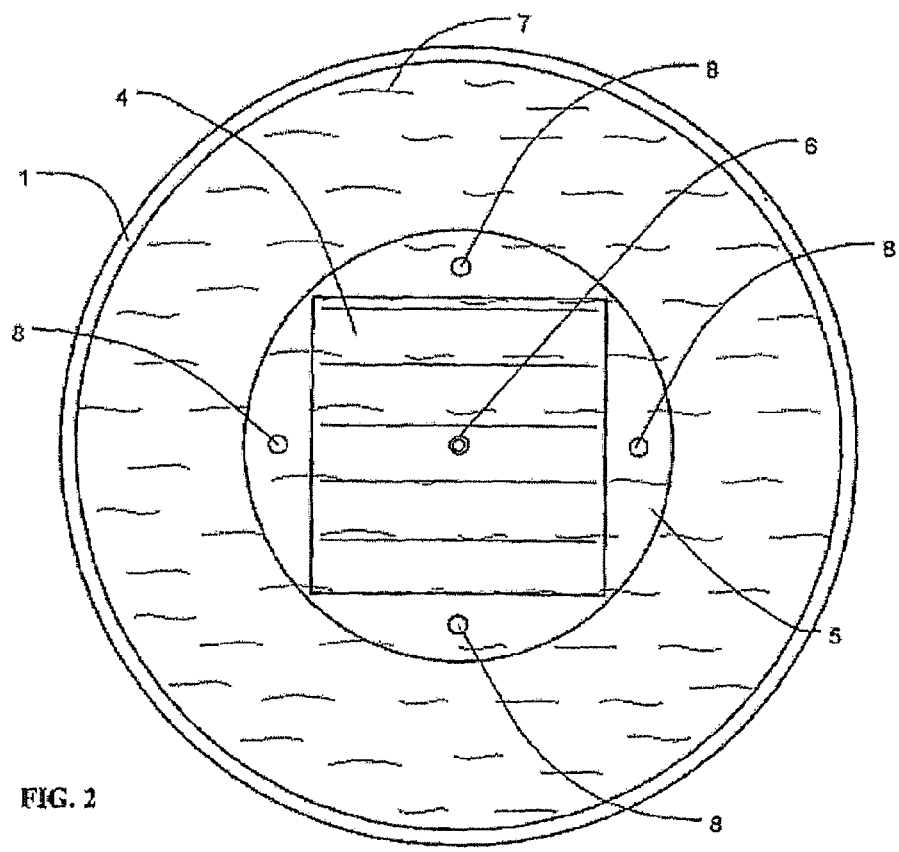
FIG. 2 shows a plan view of a water feature according to a present invention.

FIG. 1 shows a solar powered water feature in the form of a bird bath, viewed in section. FIG. 2 shows the same feature from above. The water feature body 1, has an upper portion in the form of a flat dish 101 and a lower portion in the form of a collecting basin 102 arranged below it, and is filled with water. A flat insert 5 which is circular in shape when viewed from above is positioned in the water feature body 1 and supported on a peripheral ridge 103. The insert 5 covers the collecting basin 102 and forms part of the base 104 of the flat dish 101. On the top of the insert 5 is provided a solar panel 4 the insert and solar panel constituting a solar panel assembly. The insert 5 carrying the solar panel 4, thus defines a volume of water 105 above the insert, in the collecting dish 101, and a volume of water 106 below the insert, in the collecting basin 102. The depth of the water 105 above the insert 5 is limited to a level which allows birds to stand in the water. The solar panel 4 located under the surface 7 of the water 105 provides the energy needed to operate a pump 2 through solar radiation.

The pump 2 is mounted to the lower side of the insert 5 and secured thereto and is thus disposed in the volume of water 106 in the collecting basin 102 of the water feature body 1. The solar Gall panel 4 and pump 2 are electrically connected by a connecting plug 3 which can be pulled apart. The water delivered by the pump 2 passes through a riser pipe 6 having a water outlet 107 above the surface of the water 7. from which water issues in the form of a fountain 108. The riser pipe 6 is passes through a hole in the housing 5 and solar cell 4.

The water can flow through apertures 8 in the insert 5 which provide a return oath from the upper portion into the lower portion of the water feature body 1, thus ensuring a constant supply of water to the pump 2.

Figure 3:
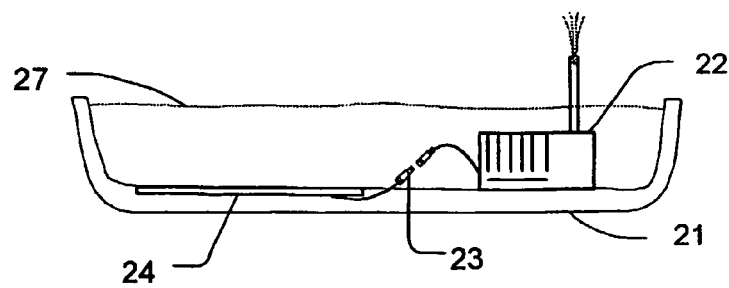
FIG. 3 shows a cross-section of a further embodiment of a water feature.

FIG. 3 shows an alternative embodiment of a water feature. A solar cell 24 and pump 22 are again mounted under the surface 27 of the water but in this case they are placed not one above the other but side by side. In this embodiment the solar cell is integrated directly in the water feature body 21 or placed therein. The electrical connection is made by a separable connecting plug 23 which is also located under the surface of the water.

The solar cell 24 is a prefabricated unit and has waterproof glass on the top and at the sides. On the underside is provided a film which is sealed off at the edges by laser treatment. A corresponding laser seal may be provided for the passage of the riser pipe 26.

Figure 4:
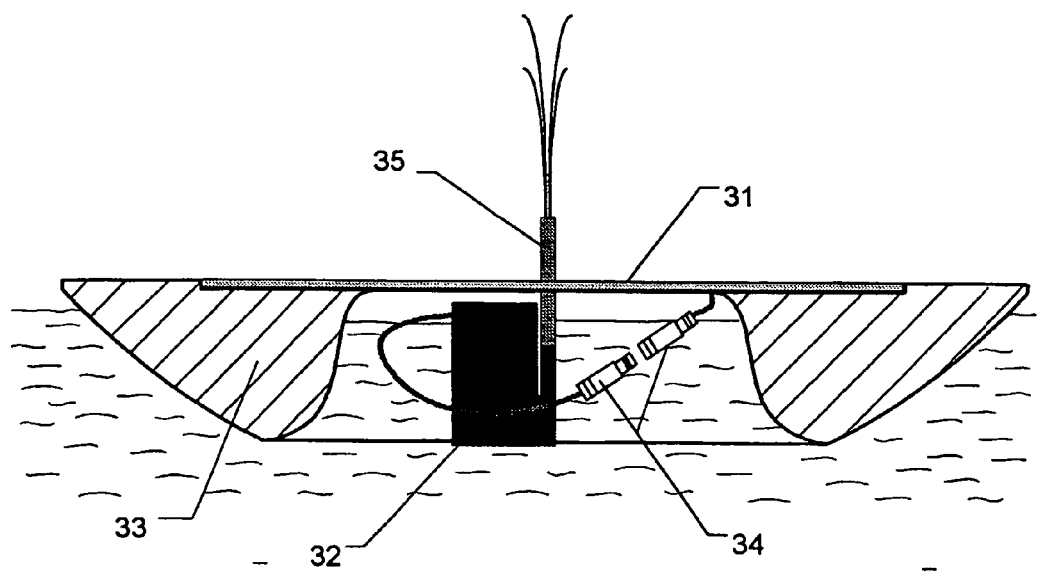
FIG. 4 shows a cross section of a floating water feature with submersible pump.

FIG. 4 shows a water feature with solar cell and pump viewed in cross-section. The solar cell 31 receives solar radiation and supplies the energy required to operate a pump 32. The solar cell is attached to a float 33 of any suitable shape and material. The pump 32 is arranged underneath the solar cell 31 and preferably releasably attached thereto or to the float 33. The solar cell 31 and pump 32 are electrically connected by a separable connecting plug 34. The water conveyed by the pump 32 emerges through a riser pipe 35 above the surface of the water in the form of a fountain. The riser pipe 35 is preferably passed through a hole in the float 33 and solar cell 31.

Figure 5:
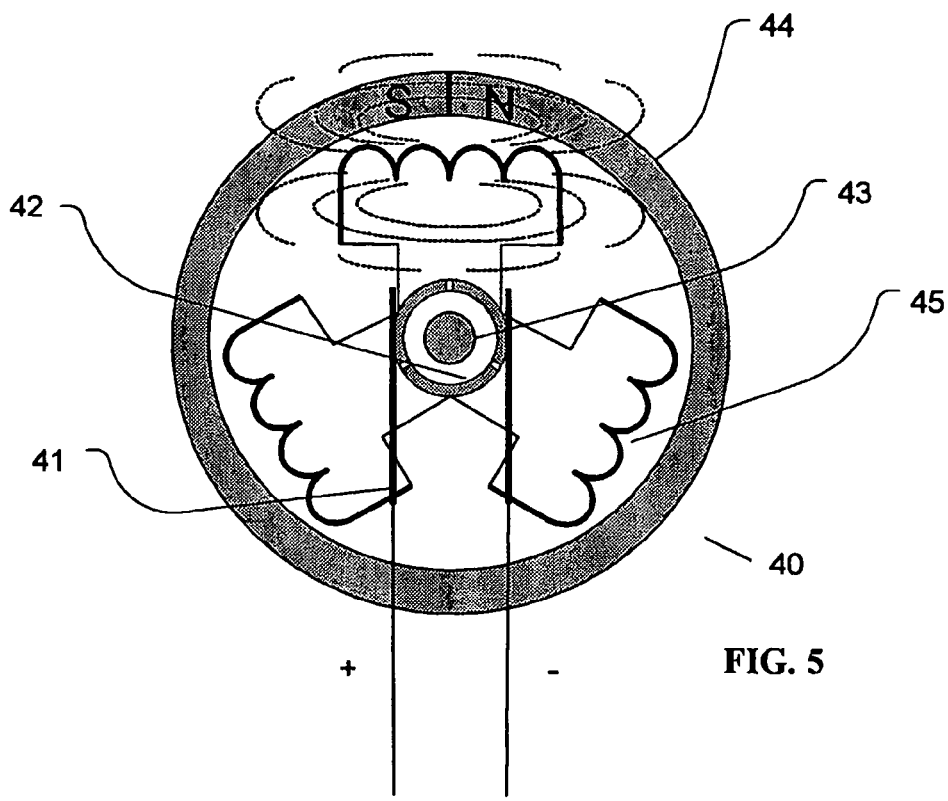
FIG. 5 is a schematic of an electric motor in cross section.
Figure 6:
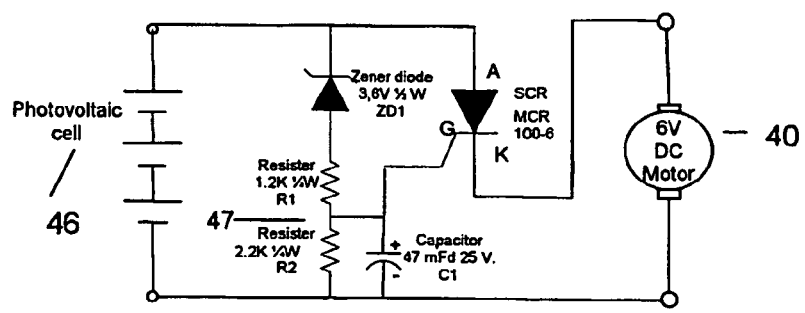
FIG. 6 shows a circuit diagram illustrating the components used in the preferred embodiment of motor controller.

FIGS. 5 to 7 illustrate the motor/pump controller.

A conventional six volt DC electric motor 40 is shown in FIG. 5 having brushes 41 connected to a commutator 42 mounted on an axle 43. The motor further comprises a permanent magnet 44 in which a moving coil 45 rotates.

Energy is supplied from the controller to the commutator 42 via brushes 41. Energy is thereby supplied to the coil 45 via the commutator which generates a magnetic field within the permanent magnet 44 which starts spinning the motor.

FIG. 6 is a schematic illustrating the control circuit according to an embodiment of the invention. The figure identifies specific components that are suitable for use in this embodiment.

A battery 46 of photovoltaic cells of a solar panel is arranged in series with a switching device SCR and the electric motor 40. The switching device SCR is in the form of a silicon controlled rectifier. The SCR is open, preventing the supply of electrical current to the motor 40, until a suitable voltage is applied at the gate G. Connected across the output of the photovoltaic cells 46 is a voltage responsive circuit comprising a Zener diode ZD1 (3.6 V, 0.5 W) and two series resistors R1 (1.2 k, 0.25 W) and R2 (2.2 k, 0.25 W). A tap 47 is connected to a point between the two resistors R1 and R2, and to the gate G of the SCR. The tap is also connected to the negative line via a capacitor C1 (47 mFd, 25 V).

The Zener diode only allows current to pass when the voltage across the diode is higher than the value of the breakdown voltage of the diode, which in this particular embodiment is 3.6 V. The value of the Zener diode is selected so that it will break down when the voltage produced by the photovoltaic cells 46 reaches the predetermined starting voltage of the electric motor which in this case has been predetermined at a nominal 3.6 V, the breakdown voltage of the Zener diode. At that point, a voltage will appear on the tap 47, and is applied to the gate G of the SCR so that the SCR closes and allows current to flow from the photovoltaic cells 46 to the electric motor 40. If the voltage produced by the photovoltaic cell drops so that the voltage across the Zener diode falls below the breakdown voltage (in this case, 3.6 V), then there will cease to be a voltage applied to the SCR gate G. However, the SCR remains closed until the voltage from the photovoltaic cell 46 is zero i.e. when there is not longer any sunlight shining on the photovoltaic cell.

In the starting position in the morning the output from the photovoltaic cells 46 will be small due to low light levels. When the voltage is below the breakdown voltage of the Zener diode no current flows through the circuit and the SCR remains open. As the light intensity increases, so too does the voltage output from the cells 46 and the potential difference across the resistors and Zener diode. Once the voltage across the Zener diode reaches the breakdown voltage of the Zener diode, the diode breaks down and current flows through the resistors R1. A voltage is then supplied to the gate G of the SCR which then closes. Once the SCR closes the electric motor is connected to the photovoltaic cells and the motor and therefore the pump begins to rotate.

Once the motor 40 begins to rotate a frequency will be generated which may interfere with the SCR gate. In order to prevent this, the capacitor C1 is provided which absorbs this frequency.

The SCR remains closed until the voltage supplied to the SCR from the photovoltaic cells 46 is zero i.e. when there is no sunlight. The SCR then opens and is re-set to its 'start' position for the next day when the SCR is triggered or 'gated' by a signal at gate G.

Figure 7B:
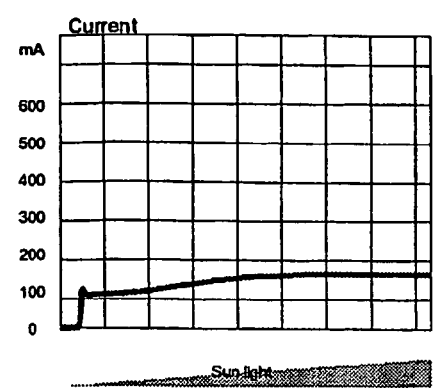

FIGS. 7A and 7B are graphs which shows the effect of the invention. As long the sun is not strong enough no voltage can reach the motor and no current flows through the motor. On dull or overcast days the SCR remains open thereby preventing any power being delivered to the motor brushes. Once the SCR is closed, when the output of the cells reaches the predetermined level, the voltage is applied to the motor. With increasing sunlight, this increases to a maximum, which in this case is 6V. Current increases accordingly. It will be noted that after the Zener diode has broken down, there is a slight voltage drop before it rises again. This can be taken into account when determining the starting voltage of the motor and the value of the Zener diode.

The invention claimed is:

1. A water feature comprising:
   (a) a vessel for containing water;
   (b) an electrically powered submersible water pump within the vessel for pumping water within the vessel to an outlet of the water feature; and
   (c) a solar panel arranged to provide electrical power to said water pump;
   wherein the solar panel is disposed within said water vessel above the water pump and so as to be beneath the water level in the vessel in use; and wherein an insert carrying the solar panel separates the vessel into an upper water containing portion and a lower water containing portion; the water pump is positioned in the lower water containing portion of the vessel below the insert carrying the solar panel; and a return path is defined by the insert for water from the upper water containing portion of the vessel to the lower water containing portion of the vessel.

2. A water feature as claimed in claim 1, wherein the outlet of the water feature is arranged to issue water through the solar panel.

3. A water feature as claimed claim 1, wherein the outlet of the water feature is arranged to issue water in the form of a fountain.

4. A water feature as claimed in claim 1 wherein the water pump is mounted to the insert.

5. A water feature as claimed in claim 1, wherein the insert is supported on a peripheral ridge of the vessel.

6. A water feature as claimed in claim 1, wherein the insert is removable.

7. A water feature as claimed in claim 1, wherein the return path comprises an aperture in the insert.

8. A water feature as claimed claim 1, wherein the return path comprises a space between the insert and a wall of the vessel.

9. A water feature as claimed in claim 1, wherein the solar panel and the water pump are electrically connected by means of a submerged, water tight, separable connection in the lower water containing portion.

10. A water feature as claimed in claim 1, wherein the upper water containing portion is in the form of a dish.

11. A water feature as claimed in claim 10, wherein the dish serves as a bird bath.

12. A water feature comprising:
    (a) a vessel for containing water;
    (b) an electrically powered submersible water pump within the vessel for pumping water within the vessel to an outlet of the water feature; and
    (c) a solar panel assembly including a solar panel arranged to provide electrical power to said water pump;
    wherein the solar panel assembly is disposed within said water vessel so as to be beneath the water level in the vessel in use, the solar panel assembly separating the vessel into an upper water containing portion and a lower water containing portion; the water pump is mounted to the lower side of the solar panel assembly so as to be positioned in the lower water containing portion of the vessel; and apertures defined by the solar panel assembly communicate water in the upper water containing portion of the vessel with water in the lower water containing portion of the vessel.

13. A water feature as claimed in claim 12, wherein the solar panel assembly is supported on a peripheral ridge of the vessel.

14. A water feature as claimed in claim 12, wherein the return path comprises an aperture in the solar panel assembly.

15. A water feature as claimed claim 12, wherein the return path comprises a space between the solar panel assembly and a wall of the vessel.

16. A water feature as claimed in claim 12, wherein the upper water containing portion is in the form of a dish.

17. A water feature as claimed in claim 16, wherein the dish serves as a bird bath.

18. A bird bath water feature comprising:
    (a) a water-containing bird bath dish, having a base;
    (b) a solar panel assembly forming the base of the dish so as to be below the level of the water in the dish, the solar panel assembly including a solar panel;
    (c) a water basin below the solar panel assembly, the water basin being filled with water which communicates with the water in the dish by means of apertures defined by the solar panel assembly;
    (d) the dish and the water basin constituting a vessel filled with water, divided into two by the solar panel assembly;
    (e) an electrically powered submersible water pump situated within the water basin, electrically connected to the solar panel of the solar panel assembly so that the solar panel provides electrical power to the water pump; and
    (f) a pipe passing through the solar panel assembly and having an outlet above the level of the water in the dish, the pipe receiving water from the pump.

19. A bird bath water feature as claimed in claim 18, wherein the solar panel assembly is supported on a peripheral ridge at the top of the water basin.

20. A bird bath water feature as claimed in claim 18, wherein the water pump is mounted to the underside of the solar panel assembly.

* * * * *